US008812582B2

(12) United States Patent
Pennington et al.

(10) Patent No.: US 8,812,582 B2
(45) Date of Patent: Aug. 19, 2014

(54) AUTOMATED SCREEN SAVER WITH SHARED MEDIA

(75) Inventors: Havoc Pennington, Westford, MA (US); Bryan Clark, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 931 days.

(21) Appl. No.: 11/564,994

(22) Filed: Nov. 30, 2006

(65) Prior Publication Data
US 2008/0133649 A1   Jun. 5, 2008

(51) Int. Cl.
*G06F 15/16* (2006.01)
*G09G 5/00* (2006.01)

(52) U.S. Cl.
CPC .................................... *G09G 5/00* (2013.01)
USPC ............ 709/203; 709/206; 715/867; 715/731

(58) Field of Classification Search
CPC ................... H04L 29/0809; H04L 29/06047; G09G 5/00; G09G 2320/046; G09G 2330/04; G06F 17/30017; G06F 17/212
USPC ......................................................... 709/203
See application file for complete search history.

(56) References Cited

U.S. PATENT DOCUMENTS

| | | | |
|---|---|---|---|
| 6,018,768 A | 1/2000 | Ullman et al. |
| 6,317,784 B1 | 11/2001 | Mackintosh et al. |
| 6,519,648 B1 | 2/2003 | Eyal |
| 6,526,411 B1 | 2/2003 | Ward |
| 6,553,180 B1 | 4/2003 | Kikuchi et al. |
| 6,714,722 B1 | 3/2004 | Tsukidate |
| 6,763,345 B1 | 7/2004 | Hempleman et al. |
| 6,957,398 B1 * | 10/2005 | Nayeri ........................... 715/867 |
| 7,069,308 B2 | 6/2006 | Abrams |
| 7,345,232 B2 | 3/2008 | Toivonen et al. |
| 7,426,537 B2 | 9/2008 | Lee et al. |
| 7,684,815 B2 | 3/2010 | Counts et al. |
| 7,698,301 B2 | 4/2010 | Lourdeaux |
| 7,730,216 B1 | 6/2010 | Issa et al. |
| 7,886,010 B1 | 2/2011 | Shankar |
| 2002/0016960 A1 | 2/2002 | Yamato et al. |
| 2002/0042915 A1 | 4/2002 | Kubischta et al. |
| 2002/0120925 A1 | 8/2002 | Logan |
| 2002/0156852 A1 | 10/2002 | Hughes et al. |
| 2002/0188947 A1 | 12/2002 | Wang et al. |
| 2002/0194598 A1 | 12/2002 | Connelly |
| 2003/0014419 A1 | 1/2003 | Clapper |
| 2003/0028595 A1 | 2/2003 | Vogt et al. |
| 2003/0028892 A1 | 2/2003 | Gewickey et al. |
| 2003/0050976 A1 | 3/2003 | Block et al. |
| 2003/0093790 A1 | 5/2003 | Logan et al. |

(Continued)

*Primary Examiner* — Phuoc Nguyen
*Assistant Examiner* — Kishin G Belani
(74) *Attorney, Agent, or Firm* — Lowenstein Sandler LLP (57) ABSTRACT

Embodiments of the present invention provide users in a social network with a screen saver constructed by media shared by their contacts and groups in a social network. The present invention provides a shared photo album that displays images from a user's own photo collection, and that of their social network automatically. For a user, the social network service queries its database to retrieve a list of photo sources. The sources of images may be online photo sharing services, other computers with photos on their local hard drives, and public peer-to-peer storage services. The images may be displayed to the user and optionally may be accompanied with information, such as the owner of the photo or descriptive phrases or comments about the photo. The social network service may be configured to continuously or periodically request photos to update the screen saver.

18 Claims, 4 Drawing Sheets

(56) References Cited

U.S. PATENT DOCUMENTS

| | | |
|---|---|---|
| 2003/0115274 A1 | 6/2003 | Weber |
| 2003/0115585 A1 | 6/2003 | Barsness et al. |
| 2003/0135513 A1 | 7/2003 | Quinn et al. |
| 2004/0039663 A1* | 2/2004 | Kernz .................... 705/27 |
| 2004/0078825 A1 | 4/2004 | Murphy |
| 2004/0083273 A1 | 4/2004 | Madison et al. |
| 2004/0128624 A1 | 7/2004 | Arellano et al. |
| 2005/0004985 A1 | 1/2005 | Stochosky |
| 2005/0022251 A1 | 1/2005 | Ohnuma et al. |
| 2005/0038819 A1 | 2/2005 | Hicken et al. |
| 2005/0097173 A1 | 5/2005 | Johns et al. |
| 2005/0114340 A1 | 5/2005 | Huslak et al. |
| 2005/0132401 A1 | 6/2005 | Boccon-Gibod et al. |
| 2005/0138659 A1 | 6/2005 | Boccon-Gibod et al. |
| 2005/0210285 A1 | 9/2005 | Williams |
| 2005/0251411 A1 | 11/2005 | Ishii et al. |
| 2005/0267766 A1* | 12/2005 | Galbreath et al. ............ 705/1 |
| 2005/0278377 A1 | 12/2005 | Mirrashidi et al. |
| 2006/0020614 A1 | 1/2006 | Kolawa et al. |
| 2006/0041902 A1 | 2/2006 | Zigmond |
| 2006/0143236 A1 | 6/2006 | Wu |
| 2006/0190824 A1* | 8/2006 | Montulli et al. ............. 715/731 |
| 2006/0195462 A1 | 8/2006 | Rogers |
| 2006/0195479 A1 | 8/2006 | Spiegelman et al. |
| 2006/0195516 A1 | 8/2006 | Beaupre |
| 2006/0195525 A1 | 8/2006 | Page et al. |
| 2006/0195532 A1 | 8/2006 | Zlateff et al. |
| 2006/0212906 A1 | 9/2006 | Cantalini |
| 2006/0239131 A1 | 10/2006 | Nathan et al. |
| 2006/0242234 A1 | 10/2006 | Counts et al. |
| 2006/0242554 A1 | 10/2006 | Gerace et al. |
| 2006/0253584 A1 | 11/2006 | Dixon et al. |
| 2006/0277455 A1 | 12/2006 | Yamada et al. |
| 2006/0288041 A1 | 12/2006 | Plastina et al. |
| 2007/0078993 A1 | 4/2007 | Issa |
| 2007/0106627 A1 | 5/2007 | Srivastava et al. |
| 2007/0106672 A1 | 5/2007 | Sighart et al. |
| 2007/0146820 A1 | 6/2007 | Asazu et al. |
| 2007/0157105 A1 | 7/2007 | Owens et al. |
| 2007/0161382 A1 | 7/2007 | Melinger et al. |
| 2007/0162432 A1* | 7/2007 | Armstrong et al. ............... 707/3 |
| 2007/0168543 A1 | 7/2007 | Krikorian et al. |
| 2007/0169165 A1 | 7/2007 | Crull et al. |
| 2007/0174389 A1 | 7/2007 | Armstrong et al. |
| 2007/0192299 A1 | 8/2007 | Zuckerberg et al. |
| 2007/0220092 A1 | 9/2007 | Heitzeberg et al. |
| 2007/0220554 A1 | 9/2007 | Barton et al. |
| 2007/0255785 A1 | 11/2007 | Hayashi et al. |
| 2007/0266401 A1 | 11/2007 | Hallberg |
| 2007/0277110 A1 | 11/2007 | Rogers et al. |
| 2007/0277127 A1* | 11/2007 | Carlson et al. ............... 715/867 |
| 2007/0282950 A1 | 12/2007 | Fischer et al. |
| 2008/0010372 A1 | 1/2008 | Khedourie et al. |
| 2008/0040474 A1 | 2/2008 | Zuckerberg et al. |
| 2008/0052371 A1 | 2/2008 | Partovi et al. |
| 2008/0065604 A1* | 3/2008 | Tiu et al. ...................... 707/3 |
| 2008/0092054 A1* | 4/2008 | Bhumkar et al. ............. 715/739 |
| 2008/0092168 A1 | 4/2008 | Logan et al. |
| 2008/0092182 A1 | 4/2008 | Conant |
| 2008/0104521 A1* | 5/2008 | Dubinko et al. ............. 715/744 |
| 2008/0133475 A1 | 6/2008 | Fischer |
| 2008/0133593 A1 | 6/2008 | Clark |
| 2008/0133638 A1 | 6/2008 | Fischer et al. |
| 2008/0133658 A1 | 6/2008 | Pennington |
| 2008/0133696 A1 | 6/2008 | Hanebeck |
| 2008/0133737 A1 | 6/2008 | Fischer et al. |
| 2008/0133763 A1 | 6/2008 | Clark et al. |
| 2008/0134039 A1 | 6/2008 | Fischer et al. |
| 2008/0134053 A1 | 6/2008 | Fischer et al. |
| 2008/0134054 A1 | 6/2008 | Clark et al. |
| 2008/0201376 A1 | 8/2008 | Khedouri et al. |
| 2008/0320139 A1 | 12/2008 | Fukida et al. |
| 2009/0019374 A1 | 1/2009 | Logan et al. |
| 2010/0162324 A1 | 6/2010 | Mehta et al. |

\* cited by examiner

AUTOMATED SCREEN SAVER WITH SHARED MEDIA

FIELD OF THE INVENTION

The present invention relates to screen savers.

BACKGROUND OF THE INVENTION

Screen savers are used by computing devices to display an image during idle periods. Typically, screen savers provide a continuously changing pattern on the display or provide a stream of images, such as a slide show of pictures. Currently, a wide variety of screen savers are offered to users. These screen savers vary in subject and complexity.

However, the known screen savers have several significant limitations. First, most screen savers comprise a static set of content. That is, the screen saver simply provides the same images or patterns continuously. For various reasons, many users like to change the content of their screen savers. Thus, users often frequently download new screen savers to their computing device. Unfortunately, it can be difficult to find a screen saver with the desired content. In addition, downloading a new screen saver may pose a security risk since the screen saver may contain viruses, spy ware, malware, etc.

Some providers on the Internet, such as Flicr, offer a service where the screen saver streams images that are updated by the service. Typically, this service requires a subscription or registration. The user may even by permitted to upload images for use in the screen saver. However, a user may not wish to subscribe to a service simply for screen saver pictures. Users may also be concerned about publishing personal images to an external service over the Internet. In addition, the user may prefer to construct pictures that are personal to them or their friends and family rather than images from general sources. Unfortunately, it is difficult to construct such a personalized screen saver.

Accordingly, it may be desirable to provide methods and systems that allow users to easily construct a personalized screen saver.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide users in a social network with a screen saver constructed by media shared by their contacts and groups in a social network. The present invention provides a shared photo album that displays images from a user's own photo collection, and that of their social network automatically. For a user, the social network service queries its database to retrieve a list of photo sources. The sources of images may be online photo sharing services, such as Flickr, Yahoo Photos, Picasa, or PhotoBucket, other computers with photos on their local hard drives, and public peer-to-peer storage services. The images may be displayed to the user and optionally may be accompanied with information, such as the owner of the photo or descriptive phrases or comments about the photo. The social network service may be configured to continuously or periodically request photos to update the screen saver.

Reference will now be made in detail to the exemplary embodiments of the invention, which are illustrated in the accompanying drawings. Wherever possible, the same reference numbers will be used throughout the drawings to refer to the same or like parts.

Figure 1:
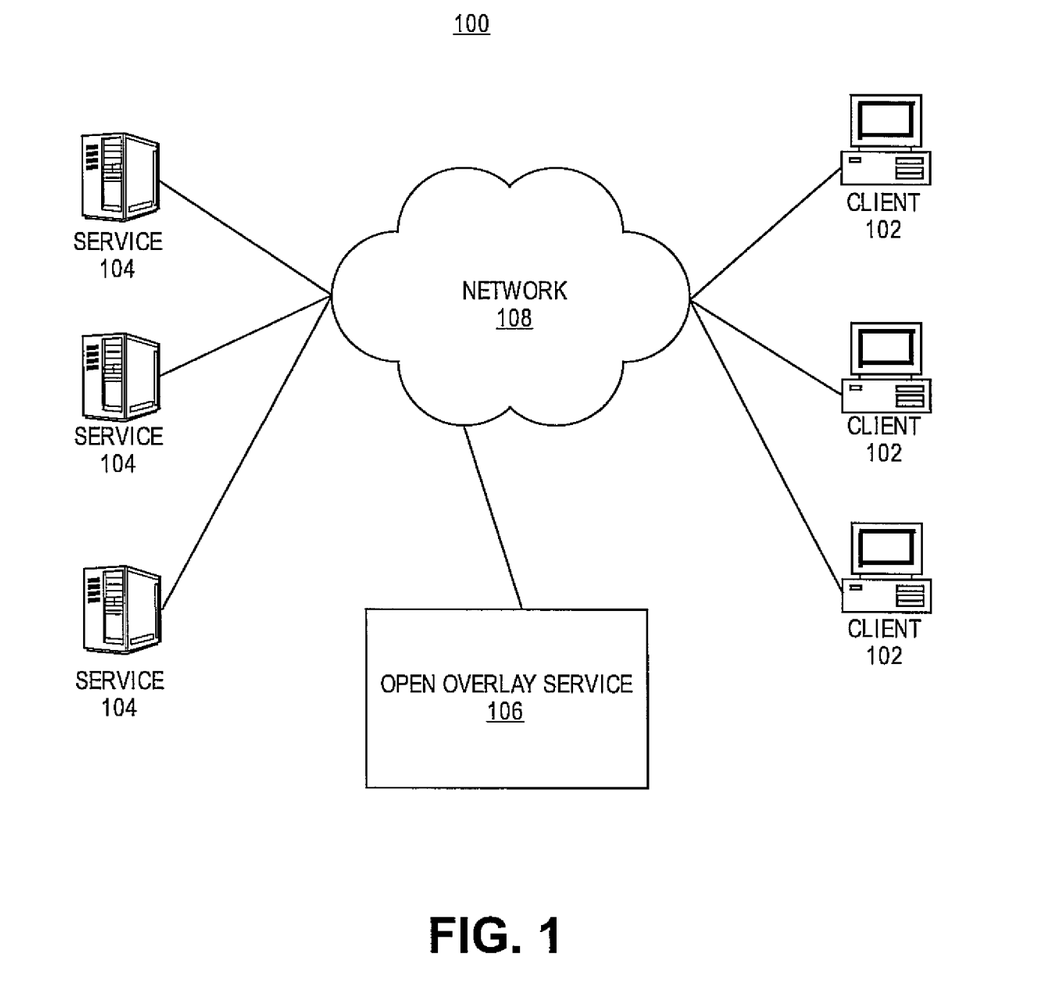
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
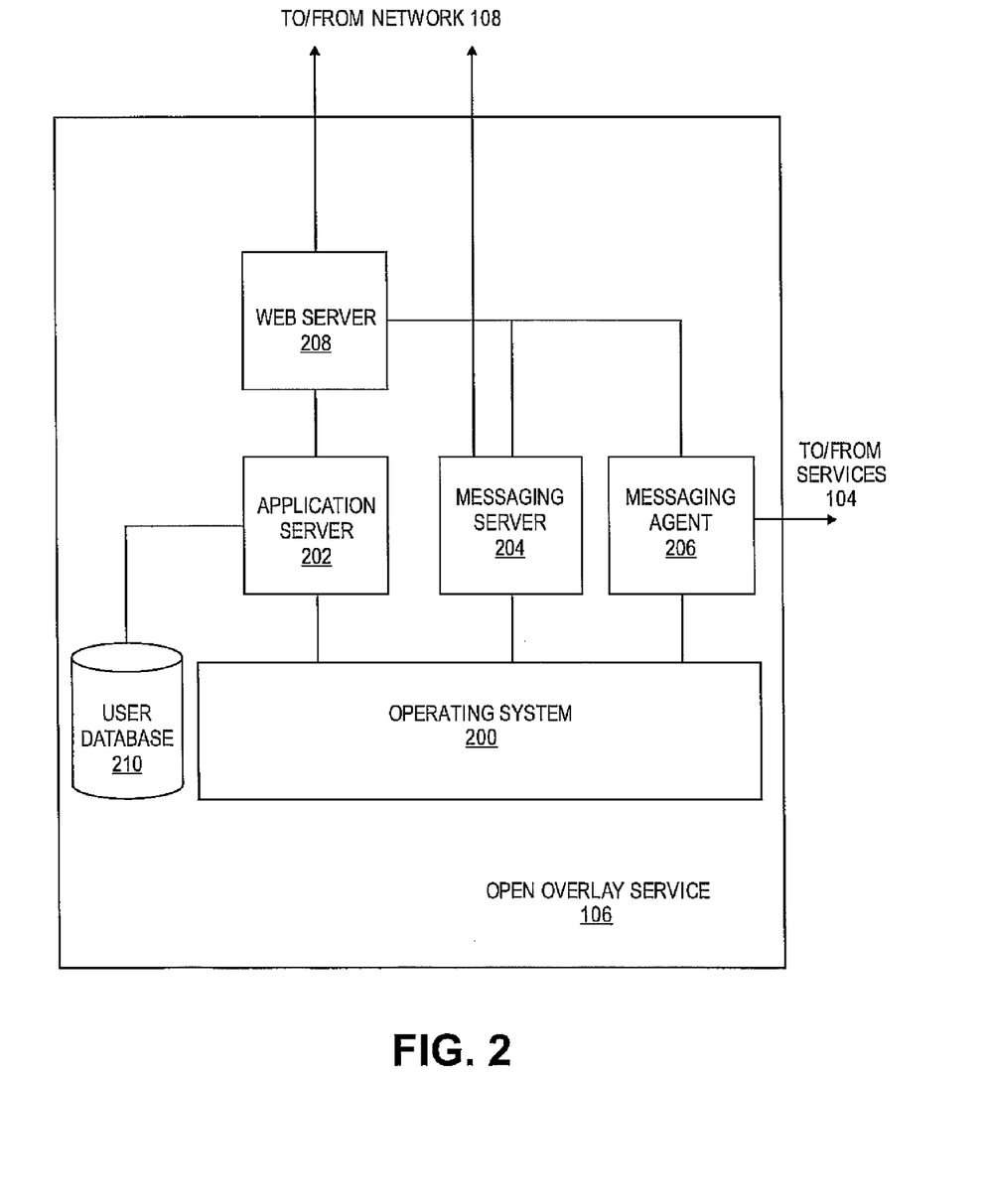
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202.

For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Figure 3:
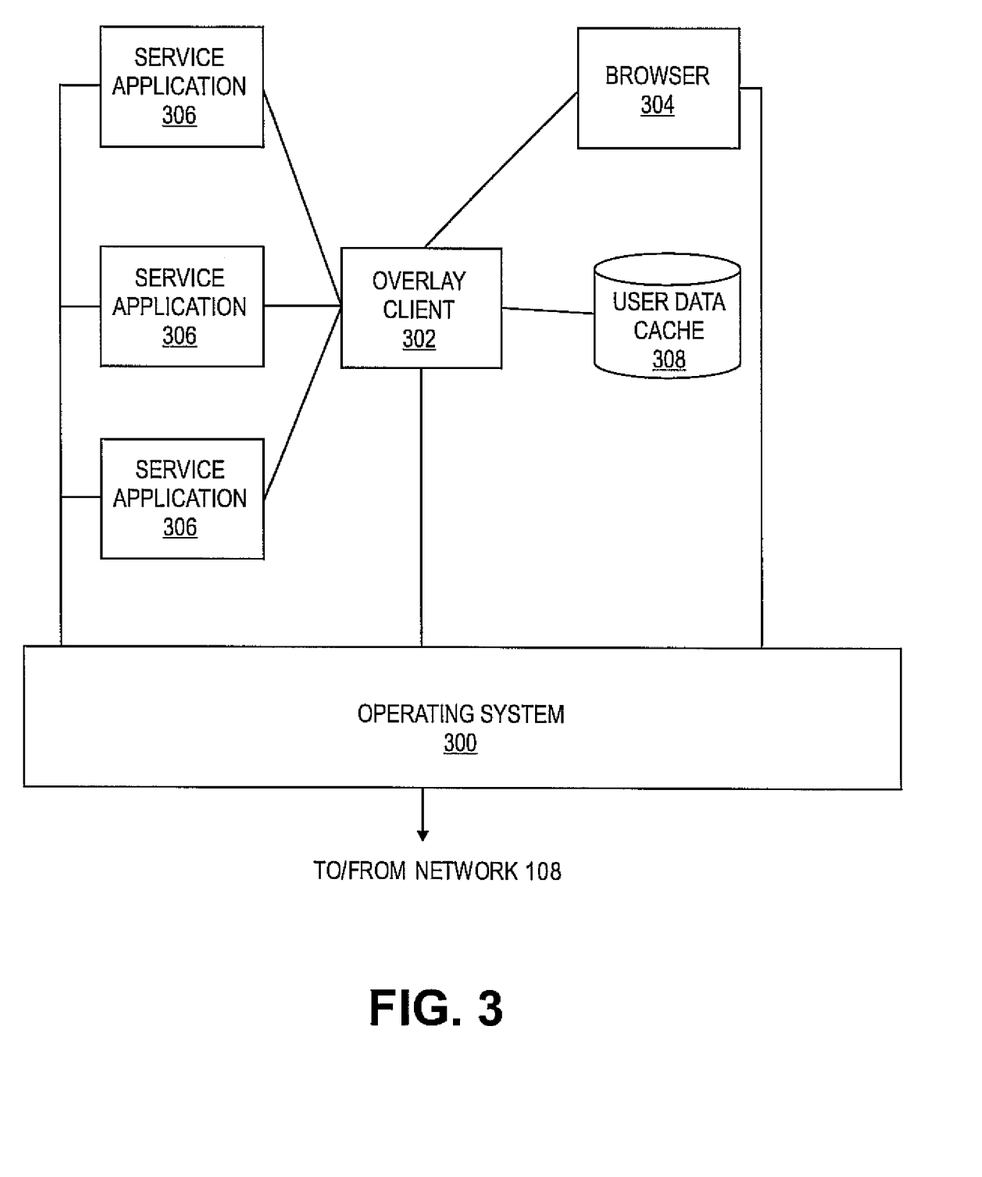
FIG. 3 illustrates an exemplary architecture for clients that are consistent with the principles of the present invention.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the lice.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 3 08 provides a cache that indicates the activity of a user at client 102. For example, user data cache 308 may include information that indicates documents, such as HTML pages, images, URL links, web site access times, and the like.

Figure 4:
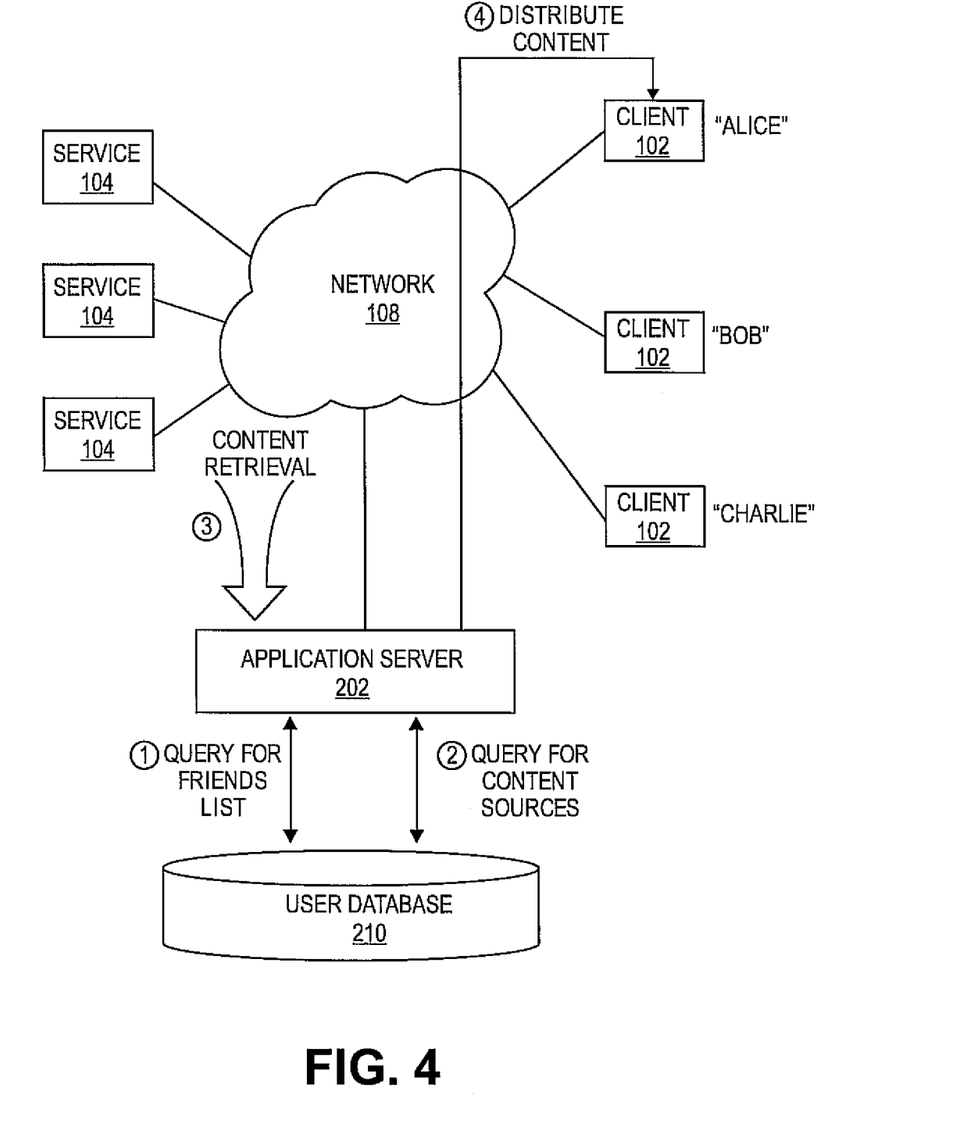
FIG. 4 illustrates a feature of the open overlay service for automatically constructing a screen saver in accordance with the principles of the present invention.

FIG. 4 illustrates a feature of open overlay service 106 for automatically constructing a screen saver in accordance with the principles of the present invention. For purposes of illustration, FIG. 4 shows a scenario where one of clients 102, labeled "Alice", is provided a screen saver constructed from shared content sourced from the other clients 102, which are labeled "Bob" and "Charlie". The shared content may be images (such as photos), video, audio, etc. Exemplary operations for constructing the screen saver will now be described.

In general, open overlay service 106 and clients 102 cooperate to automatically construct a screen saver that displays images from a user's own photo collection, and that of their friends and groups automatically. Initially, application server 202 queries database 210 to retrieve a list of users and groups that are of interest or known to Alice. For example, Alice may be interested in having a shared screen saver based on content from her school friends, her family, etc. In addition, Alice may be interested in content from a group, such as a fan club, a sports team, etc. In response, database 210 may provide a list of "friends" that comprise the users and groups matching this query. For purposes of this illustration, FIG. 4 shows clients 102, Bob and Charlie are friends of Alice.

For each of these "friends" of Alice, application server 202 then queries database 210 to retrieve a list of sources 104 for that friend. For example, these sources may be online photo sharing services, such as Flickr, Yahoo Photos, Picasa, or PhotoBucket, that open overlay service 106 may interface. Alternatively, some of these sources may be other clients 102 having photos on their local bard drives. Other sources, such as a public peer-to-peer storage services and devices, may also be sources used by the friends.

For each source, open overlay service 106 then retrieves a set of photos from across the photo sources. In order to retrieve the content, open overlay service 106 may utilize the client-side data scraping techniques described above. This ensures that open overlay service 106 only retrieves photos that are properly accessible by Alice, Bob, and Charlie.

Application server 202 distributes the content to Alice and the screen saver is configured to include the content. The screen saver may be implemented as part of another application, such as web browser 304 or overlay client 302, or as its own service application 306 that is controlled, for example, by overlay client 302. One skilled in the art will recognize that there is wide variety of ways that a screen saver can be implemented on clients 102.

Application server 202 may also filter the screen saver content distributed to Alice based on Alice's profile or other criteria. For example, application server 202 may filter the screen saver content based on various criteria, such as Alice's age, Alice's location, Alice's other activities in open overlay service 106 as indicated in cache 308, etc.

Application server 202 may retrieve the photos directly and display them to Alice, for example, in web browser 304 running on client 102. Alternatively, application server 202 may retrieve the photos from the source and pass the photo data to overlay client 302 running on client 102. As another alternative, application server 202 may instruct overlay client 302 to retrieve the content from the original source. For example, overlay client 302 may be routed to a hosted online photo service to retrieve the shared content or may be routed to Bob or Charlie in a peer-to-peer fashion. The content may be in a specific order (such as sorted by time or by person) or in a random order.

Furthermore, the screen saver may display images with accompanying information. For example, this accompanying information may be information that indicates the owner of the photo or descriptive phrases or comments about the photo. Alternatively, the accompanying information may be a corresponding audio track or clip. The user at client 102 may configure overlay client 302 in various ways to control the operations of the screen saver.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
providing, by a hardware processor, an overlay client on a first computing device, the overlay client to provide an interface between a service application on the first computing device and an online service;
identifying a set of content sources associated with a first user comprising a local storage device of the first computing device;
obtaining, via the overlay client, content from the set of content sources;
receiving, by the overlay client, a poll request associated with the content from a message server, wherein the poll request comprises an instruction to perform a client-side data scraping operation;
originating, by the hardware processor, a data request in response to the client-side data scraping operation;
causing, by the overlay client, the service application to submit the data request to the online service in view of the poll request; and
receiving a message associated with a second user from the online service in view of the data request, wherein the message corresponds to an activity of the online service, wherein the first user has previously engaged with the online service, and wherein the activity is of interest to the first user.

2. The method of claim 1, wherein the local storage device is part of a peer-to-peer storage service.

3. The method of claim 1, wherein the content is filtered in view of a relationship of the first user with the source of content.

4. The method of claim 1 further comprising sending the content to a second computing device associated with the second user.

5. The method of claim 4, wherein sending the content to the second computing device comprises:
retrieving the content from the set of content sources; and
distributing the content that was retrieved to the second user.

6. The method of claim 1, wherein sending the content to the second computing device comprises sending a command that instructs an application to retrieve the content from the source.

7. The method of claim 1, further comprising transmitting the data request to the online service in view of the client-side data scraping operation.

8. The method of claim 1 further comprising sharing the content to a second computing device.

9. The method of claim 8, wherein the content shared to the second computing device comprises a comment about the content.

10. The method of claim 8, wherein the content is a digital image, the method further comprising:
identifying digital images of a plurality of users; and
providing a shared photo album of a collection of digital images of the plurality of users, wherein each of the plurality of users has access to add a new digital image to the shared photo album.

11. The method of claim 8, wherein content from the source of content associated with the first user is filtered based on recent activity of the first user in a social network.

12. The method of claim 1, wherein the online service is associated with a social network, the method further comprising:
identifying a source of the content associated with the second user, wherein the set of content sources associated with the first user comprises the source of content associated with the second user; and receiving, from via the overlay client, content from the source of content associated with the second user.

13. A computer comprising:

a storage device; and hardware processor, operably:

provide an overlay client to a first user in an online social network, the overlay client to provide an interface between a service application on the computer and the online social network;

identify a set of content sources associated with the first user comprising the storage device obtain via the overlay client, content from the set of content sources;

receive a poll request associated with the content from a message server, wherein the poll request comprises an instruction to perform a client-side data scraping operation;

originate a data request in response to the client-side data scraping operation;

cause the service application to submit the data request to the online social network in view of the poll request; and receive a message associated with a second user from the online social network-that corresponds to an activity of the online social network, wherein the first user has previously engaged with the online social network, and wherein the activity is of interest to the first user.

14. The computer of claim 13, wherein the hardware processor is to display information that identifies the content in a display device.

15. The computer of claim 13, wherein the service application is to periodically request new content from the set of content sources.

16. A system comprising:

a database comprising information that identifies a first user of a social network system and a source of content available to the first user; and an application executed by a hardware processor to perform operations comprising:

provide an overlay client to the first user, the overlay client to provide an interface between a service application and an online service;

identify a set of content sources associated with the first user comprising a storage device local to the first user;

obtain content from the set of content sources;

receive, by the overlay client, a poll request associated with the content from a message server wherein the poll request comprises an instruction to perform a client-side data scraping operation;

originate a data request in response to the client-side data scraping operation;

cause, by the overlay client, the service application to submit the data request to the online service in view of the poll request; and receive, via the overlay client, a message associated with a second user from the online service in view of the data request, wherein the message corresponds to an activity of the online service, wherein the first user has previously engaged with the online service, and wherein the activity is of interest to the first user.

17. The system of claim 16, wherein the application is further to retrieve accompanying information about the content and provide the accompanying information to the first user for display with the content.

18. The system of claim 16, wherein the application is further to periodically identify updated content and distribute the updated content to the first user.

* * * * *